US011002150B2

(12) United States Patent
Perez (10) Patent No.: US 11,002,150 B2
(45) Date of Patent: May 11, 2021

(54) DE-ICING SHROUD FOR A COMPRESSOR OF TURBOMACHINE

(71) Applicant: SAFRAN AERO BOOSTERS SA, Herstal (BE)

(72) Inventor: Rafael Perez, Boncelles (BE)

(73) Assignee: SAFRAN AERO BOOSTERS SA, Herstal (BE)

(*) Notice: Subject to any disclaimer, the term of this patent is extended or adjusted under 35 U.S.C. 154(b) by 184 days.

(21) Appl. No.: 16/461,194

(22) PCT Filed: Nov. 3, 2017

(86) PCT No.: PCT/EP2017/078208
§ 371 (c)(1),
(2) Date: May 15, 2019

(87) PCT Pub. No.: WO2018/091288
PCT Pub. Date: May 24, 2018

(65) Prior Publication Data
US 2019/0309653 A1    Oct. 10, 2019

(30) Foreign Application Priority Data
Nov. 15, 2016   (BE) .................. 2016/5859

(51) Int. Cl.
F01D 25/02  (2006.01)
F01D 11/00  (2006.01)
(Continued)

(52) U.S. Cl.
CPC ............ *F01D 25/02* (2013.01); *F01D 11/001* (2013.01); *F01D 11/122* (2013.01); *F02C 7/047* (2013.01);
(Continued)

(58) Field of Classification Search
CPC ...... F01D 25/02; F01D 11/001; F01D 11/122; F04D 29/164; F04D 29/526; F04D 29/161; F04D 29/522; F02C 7/047; Y02T 50/60
(Continued)

(56) References Cited

U.S. PATENT DOCUMENTS 9,140,187 B2 *  9/2015  Ribarov ................ H05B 6/109
9,469,408 B1 * 10/2016  Elangovan ............ B64D 15/12
2009/0196730 A1  8/2009  Jahns

FOREIGN PATENT DOCUMENTS

EP    2418387 A1   2/2012
EP    3023511 A1   5/2016
(Continued)

OTHER PUBLICATIONS

Search Report dated Feb. 22, 2018 for Parent PCT Appl. No. PCT/EP2017/078208.

*Primary Examiner* — J. Todd Newton
(74) *Attorney, Agent, or Firm* — James E. Walton (57) ABSTRACT

Shroud assembly of an axial turbomachine (2) having a rotor (12), such as a turbomachine compressor air-intake shroud (28). The assembly comprises an annular layer (32) of abradable material that is able to cooperate by abrasion with lips (44) of the turbomachine in order to ensure tightness, and a heating module (38) for the abradable layer (32). The module (38) comprises electrical heating resistors (42) within the abradable material in order to prevent the presence of ice on the shroud (28). The abradable material is thus used as a heating body which receives, transports and distributes the heat used for de-icing.

20 Claims, 5 Drawing Sheets

(51) Int. Cl.
*F01D 11/12* (2006.01)
*F02C 7/047* (2006.01)
*F04D 29/16* (2006.01)
*F04D 29/52* (2006.01)

(52) U.S. Cl.
CPC ......... *F04D 29/161* (2013.01); *F04D 29/164* (2013.01); *F04D 29/522* (2013.01); *F04D 29/526* (2013.01); *Y02T 50/60* (2013.01)

(58) Field of Classification Search
USPC .................................................. 415/174.4
See application file for complete search history.

(56) References Cited

FOREIGN PATENT DOCUMENTS

| FR | 2943717 A1 * | 10/2010 | ............. F01D 25/10 |
| FR | 2943717 A1 | 10/2010 | |

\* cited by examiner

DE-ICING SHROUD FOR A COMPRESSOR OF TURBOMACHINE

TECHNICAL FIELD

The invention relates to the field of de-icing of a turbomachine. More specifically, the invention relates to a turbomachine shroud assembly. The invention also relates to an axial turbomachine, in particular an aircraft turbojet engine or an aircraft turboprop engine. The invention further provides a use of a layer of abradable material.

PRIOR ART

Document EP 2 418 387 A1 discloses a shroud of a turbojet engine. The shroud comprises: a support generally of annular or cylindrical shape with a generally circular inner surface; a ring with an inner surface and an outer surface opposite to said inner surface and disposed on the inner surface of said support; a layer of abradable material disposed on the inner surface of said ring, wherein the support is made of organic matrix composite material; and said ring is made of metallic material. Such an arrangement effectively binds an abradable layer to a composite housing to ensure its sealing.

However, in a turbojet engine, a shroud may be subject to the phenomenon of icing. When such an event occurs ice can form in contact with the inner shroud and the outer shroud and may cover the intrados and extrados surfaces of the blades. In extreme conditions, the accumulation of ice can plug the passages between the blades, and thus interrupt the air flow of the compressor that cannot feed the combustion chamber. The turbojet can thus no longer provide thrust.

EP 3 023 511 A1 discloses a composition for an abradable material for a compressor of a turbomachine. The compressor comprises heating elements able to heat a coating of abradable material. But no particular role is associated with this heating.

SUMMARY OF THE INVENTION

Technical Problem

The invention aims to solve at least one of the problems posed by the prior art. More precisely, the purpose of the invention is to optimize the de-icing of a turbomachine shroud, and possibly of a rectifier at the compressor inlet. The invention also aims to guarantee the axial passage along a turbomachine shroud. The invention also aims to provide a simple solution, resistant, lightweight, economical, reliable, easy to produce, convenient maintenance, easy inspection, and improving performance.

Technical Solution

The invention relates to a shroud assembly for an axial turbomachine with a rotor, in particular an inlet compressor shroud of a turbomachine, the assembly comprising a shroud with a layer of abradable material adapted to abrasively cooperate with the rotor of the turbomachine, and further comprising a heating module for heating the layer of abradable material so as to counter-act the presence of ice on the shroud.

According to advantageous embodiments of the invention, the assembly may comprise one or more of the following features, taken separately or according to any possible technical combinations:

The heating module comprises an electric heating resistor in thermal contact of the abradable layer, preferably, the electrical resistance has a section less than or equal to 1 mm$^2$, or 0.10 mm$^2$.

The electric heating resistor is arranged within the radial thickness of the abradable layer.

The electric heating element comprises one or more electric heating ribbons.

The abradable layer comprises an envelope surface, the heating module being in contact with said envelope surface.

The envelope surface comprises an inner annular surface and/or an outer annular surface, the heating module being in contact with the inner annular surface and/or the outer annular surface.

The abradable material is electrically resistive and is configured to heat to oppose the presence of ice on the shroud when the de-icing module electrically feeds said material of the abradable layer.

The abradable layer comprises particles that are electrically conductive and configured to heat the shroud to oppose the presence of ice on the shroud.

The abradable layer forms a block of heating material, especially thanks to a power source.

The shroud further comprises an annular wall supporting the abradable layer at an interface surface, the heating module at least partially forming said interface.

The heating module comprises a magnetic field source capable of heating the abradable layer.

The abradable layer comprises a first annular layer radially away from the heating module and/or a second annular layer in contact with the heating module and which has a thermal conductivity greater than the thermal conductivity of the first layer.

The heating module comprises a heating network in thermal contact of the abradable layer, said network being optionally disposed within the radial thickness of the abradable layer.

The network comprises one or more pipes for heating fluid, in particular a gas or a liquid such as oil.

The shroud is electrically insulating and/or electrically insulated from the abradable layer.

The heating module is adapted to heat the abradable layer by electromagnetic waves and/or using a magnetic field.

The shroud comprises an annular flow guiding surface of the turbomachine, said surface being generally tubular, and/or surrounding the heating module.

The average radial thickness of the abradable layer is greater than or equal to: 2.00 mm, or 5.00 mm.

The electric heating resistor and/or the heating network and/or the one or more or each heating fluid pipe (s) at least partially form the interface between the abradable layer and the annular wall of the shroud; and/or is/are arranged in the thermally conductive layer.

The material of the abradable layer is electrically resistive so as to heat it when it is electrically powered to oppose the presence of frost on the shroud.

The invention also relates to an assembly for an axial rotor turbine junction, including a turbomachine compressor inlet junction, the assembly comprising a seal with an annular layer of abradable material adapted to cooperate in a sealed manner with the rotor of the turbomachine, and further comprising a heating module of the abradable layer to oppose the presence of frost on the shroud.

The invention also relates to a turbomachine, in particular a turbojet, comprising one or at least two assemblies, wherein the at least two assemblies are/are in accordance with the embodiments above, preferably the turbomachine comprises a compressor, the at least one pair of shrouds being shrouds of said compressor, the compressor possibly being a low-pressure compressor.

According to advantageous embodiments of the invention, the assembly may comprise one or more of the following features, taken separately or according to all the possible technical combinations:

The shroud is an inner ring of an upstream rectifier of the compressor.

The turbomachine comprises a splitter nose, possibly at the compressor inlet, the shroud being an outer shroud of the splitter nozzle.

The turbomachine comprises a control unit configured so as to heat the abradable layer so that the temperature of the shroud remains greater than 0° C.

The turbomachine comprises an annular row of stator vanes rigidly connected to the shroud, the heating module being able to heat the abradable layer so as to oppose the presence of ice on said stator vanes, in particular through the or at least one shroud.

The rotor of the turbomachine comprises at least one or more wipers cooperating abrasively with the abradable layer, the or at least one or each wiper optionally being at a distance axially and/or radially from the heating module.

The at least one or each wiper is axially remote from the electric heating resistor; and/or the heating network; and/or one or more or each heating fluid pipe.

The compressor comprises a plurality of inner shrouds including an upstream inner shroud, the inner shroud having a heating module of the abradable layer to oppose the presence of frost being downstream of the upstream shell.

The invention also relates to a use of an abradable heating layer for de-icing an axial turbomachine shroud, the abradable layer optionally comprising a silicone material or a silicone polymer aluminum composition or an aluminum polymer nickel composition, said abradable layer being preferably an abradable shell layer associated with a heating module so as to form an assembly according to the invention.

The abradable layer may be intrinsically heated. By intrinsically heating is meant that the layer is able to provide calories by itself. The abradable layer may be an energy converter, for example converting electrical energy into thermal energy.

In general, the advantageous embodiments of each object of the invention are also applicable to the other objects of the invention. Each object of the invention is combinable with other objects, and the objects of the invention are also combinable with the embodiments of the specification, which in addition are combinable with each other, according to any possible technical combinations.

Advantages Brought

The invention allows to efficiently protect the shroud while using a simple and compact system since it is housed in part in the abradable layers. This solution is particularly beneficial in the context of an inner shroud at the compressor inlet. De-icing remains optimal even when the inner shroud extends upstream of the separation edge of the splitter nose.

The energy used in the invention is easily transported and distributed in the shroud. The weight of the de-icing system remains essentially reduced since the electrical resistors or the pipes remain thin, just like their connection to the control unit. The invention adds a body in the abradable which improves the resistance without modifying the compactness.

The protection can be increased while remaining homogeneous. The protection can be optimized according to the importance of the icing phenomenon. By thermal conduction via the blades, the anti-icing effect is spread on the intrados and extrados surfaces.

DESCRIPTION OF THE PREFERRED EMBODIMENTS

In the following description, the words "internal" and "external" refer to a position relative to the axis of rotation of an axial turbomachine. The axial direction corresponds to the direction along the axis of rotation of the turbomachine. The radial direction is perpendicular to the axis of rotation. Upstream and downstream are used in reference to the direction of the main flow in the turbomachine.

Figure 1:
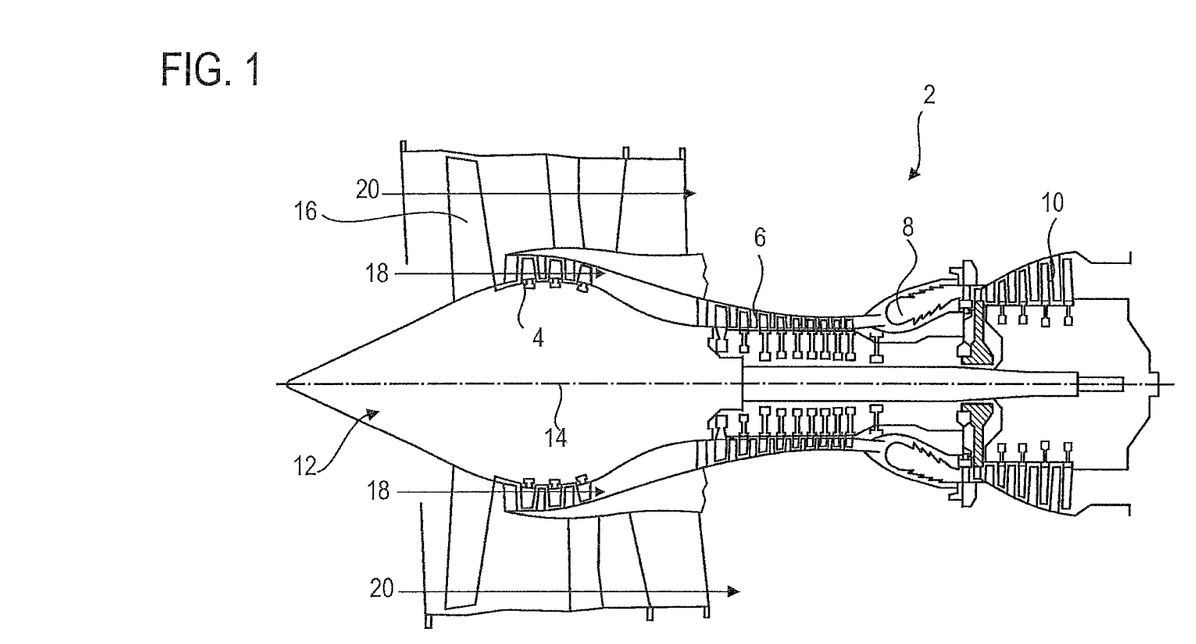
FIG. 1 represents an axial turbomachine according to the invention.

FIG. 1 is a simplified representation of an axial turbomachine. It is in this case a double-flow turbojet engine. The turbojet engine 2 comprises a first compression level, called a low-pressure compressor 4, a second compression level, called a high-pressure compressor 6, a combustion chamber 8 and one or more levels of turbines 10. In operation, the mechanical power of the turbine 10 is transmitted via the central shaft to the rotor 12 which sets in motion the two compressors 4 and 6. The latter comprises several rows of rotor blades associated with rows of stator vanes. The rotation of the rotor about its axis of rotation 14 thus makes it possible to generate an air flow and to compress it progressively until it reaches the combustion chamber 8.

A fan 16 is coupled to the rotor 12 and generates a flow of air which is divided into a primary flow 18 through the various levels mentioned above of the turbomachine, and a secondary flow 20 through a conduit. The secondary flow can be accelerated to generate a thrust.

The primary flow 18 and secondary flow 20 are annular flows coaxial and fitted into one another. The fan can be of the non-ducted type, for example with double counter-rotating impellers.

Figure 2:
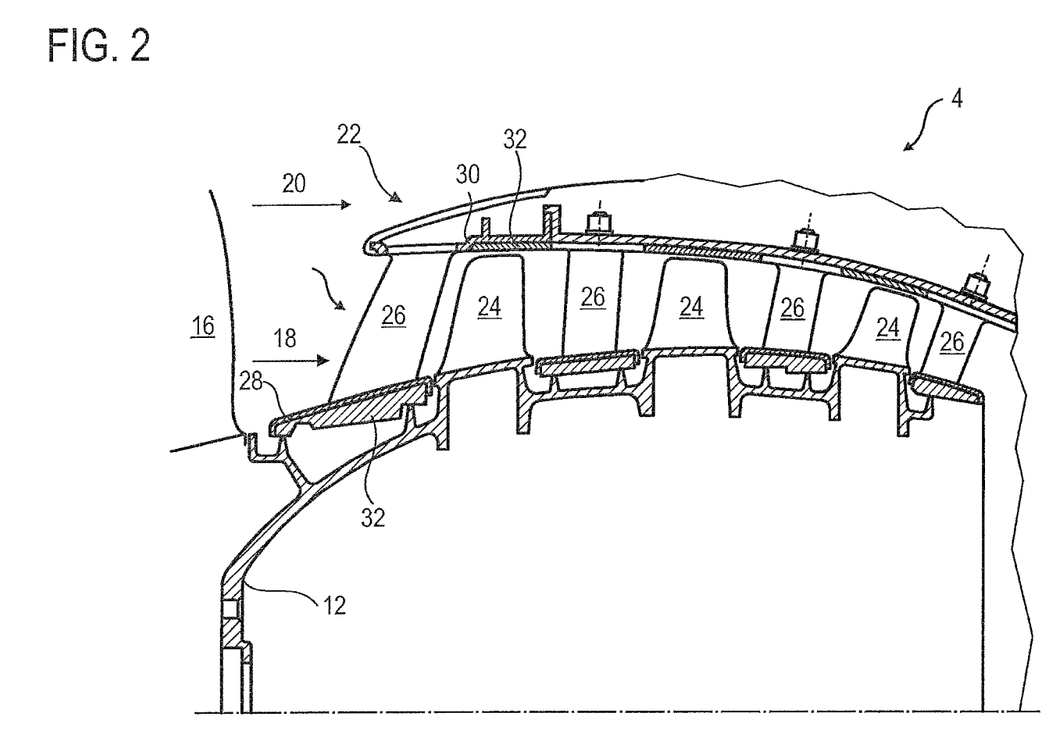
FIG. 2 is a diagram of a turbomachine compressor according to the invention.

FIG. 2 is a cross view of a compressor of an axial turbomachine such as that of FIG. 1. The compressor may be a low-pressure compressor 4. There may be seen a part of the fan 16 and the splitter nose 22 separating the primary flow 18 from the secondary flow 20. The rotor 12 comprises several rows of rotor blades 24, in this case three.

The low-pressure compressor 4 comprises several rectifiers, in this case four, each containing a row of stator vanes 26. The rectifiers are associated with the fan 16 or a row of rotor blades to straighten the flow of air, so as to convert the speed of the flow into pressure.

The stator vanes 26 extend essentially radially from an inner shroud 28 to an outer shroud 30, or to an outer casing. Said shrouds (28; 30) may carry annular layers of abradable material 32. These layers of abradable material 32 crumble or wear during contact with the rotor 12 without damaging the rotor 12. With this property, the abradable layer 32 can be brought closer to the rotor blades 24 and wipers, which improves the dynamic seal.

To counteract the presence of ice, the turbomachine is provided with a de-icing system, or anti-icing system, associated with at least one or at least two abradable layer 32 upstream of the compressor 4. At least one or each shroud (28; 30) is made of electrically insulating material, for example an organic matrix composite.

Figure 3:
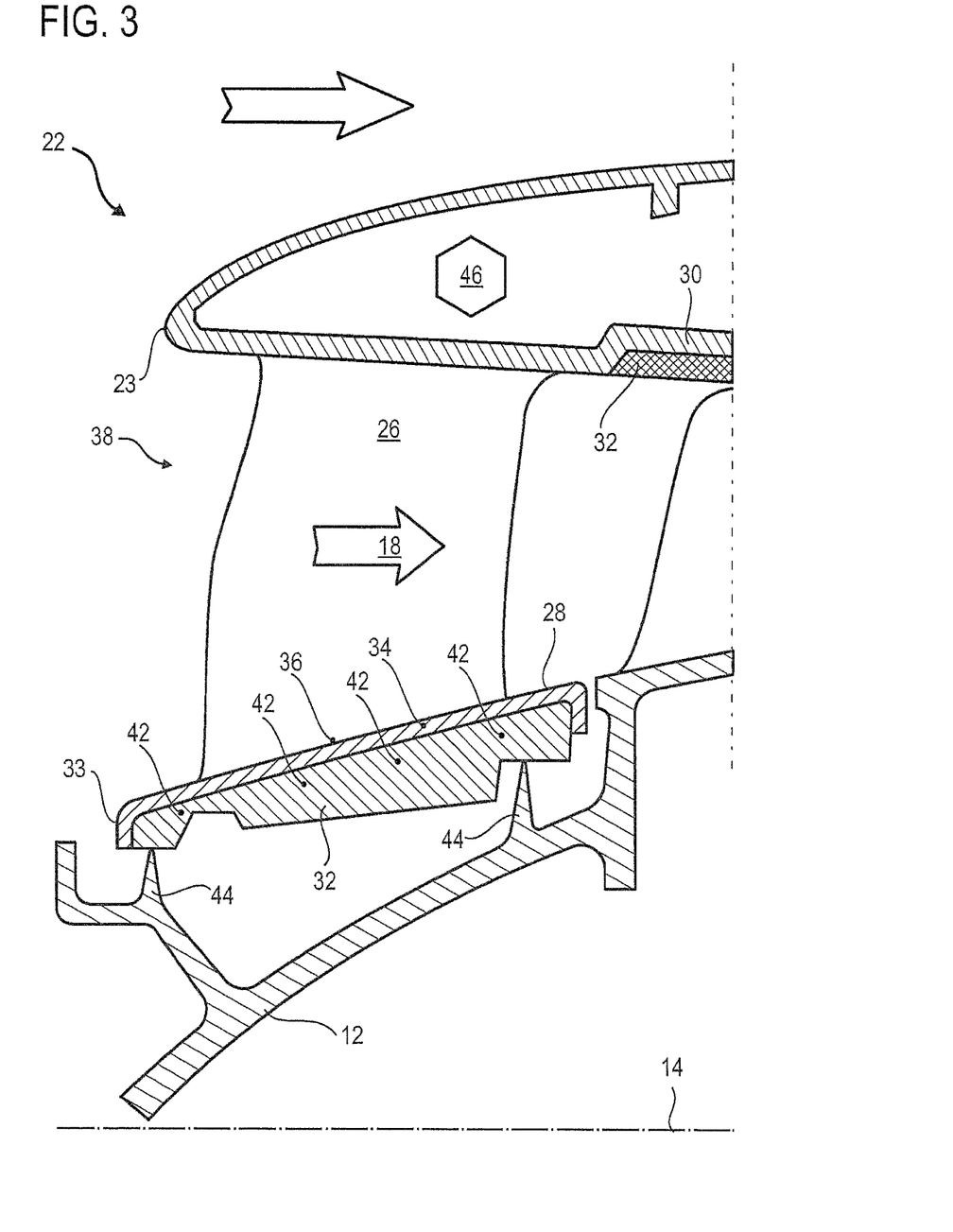
FIG. 3 illustrates a shroud assembly according to a first embodiment of the invention.

FIG. 3 sketches a shroud assembly (28; 30) according to a first embodiment of the invention.

The inner shroud 28 has an annular partition 34 which supports an abradable layer 32. The inner shroud 28 may be a shroud at the inlet of the compressor, and may extend as a cantilever upstream to the fan. Its upstream edge 33 may protrude from the separation edge 23 of the splitter nose 22. The annular profile of the annular partition 34 extends mainly axially. The partition 34 may be tubular, and/or substantially conical. It shows an outer surface 36 in contact with the primary flow 18 so as to delimit and guide the flow 18.

The assembly comprises a heating module 38 for heating the abradable layer 32 in order to reduce and prevent the formation and/or accumulation of ice on the inner shroud 28. The heating module 38 is in thermal contact with the abradable layer 32. It is embedded therein. The external envelope of this latter also envelopes the heating module 38. The abradable layer 32 and the optional partition 34 protect the heating module 38 of the primary flow 18, in particular from abrasion.

The abradable material may be silicone, for example molded into the wall 34 by encapsulating the heating module. Alternatively, the abradable material may be plasma sprayed into the inner shroud 28. It may be a polymer matrix containing metallic grains, for example of the nickel aluminum or aluminum silicon type.

The heating module 38 comprises one or more electric heating resistors 42 in thermal contact with the abradable layer 32, and preferably embedded therein. The resistors 42 are electrical conductors. They produce heat by Joule effect. It may be one or more resistive electrical wires placed at the heart of the abradable. The electric heating resistors can also be electrical ribbons, strips or tapes. These ribbons can form heating webs, which possibly describe coils or circles around the axis of rotation 14.

These heating resistors 42 may extend along the circumference around the axis of rotation 14. They may form parallel and coaxial circles which are distributed axially along the shroud 28. In the present example, four resistors 42 are shown, however any other number can be used.

The electric heating resistors 42 may each be single strand, and show a conductive section less than or equal to: 1 mm$^2$, or 0.10 mm$^2$, or 0.02 mm2. The smaller their section the higher their electrical resistance but the smaller their weight.

The heating resistors 42 are arranged along the inner shroud 28. At least one or more heating resistors 42 are arranged axially at the stator vanes 26. At this location, the heat input can be communicated to the vanes 26 by thermal conduction. This tends to de-ice the vanes and increase the heat exchange surface with the primary flow 18. Thus, the capacity of the system improves radially of the outer surface 36, and protects the boundary layers against ice.

To optimize the seal, the rotor 12 of the compressor can show at least one or more wipers 44 cooperating abrasively (grinding contact) with the abradable layer 32. These wipers 44 form annular protruding ribs capable of digging grooves in case of contact with the abradable 32. Optionally, each wiper 44 is remote from the electric heating resistors 42, for example remote axially and/or remote radially. The radial distance can be designed to avoid furrows. Thus, the potential contact of the wipers 44 with the abradable 32 does not degrade the de-icing system.

The heating modules are controlled by a control unit 46 of the de-icing system. The system can detect the presence of ice, measure a temperature, a humidity of the primary stream 18. The control unit 46 can be configured to heat the abradable layer 32 so that the temperature of the shroud 28 remains higher than 0° C., or 20° C., or 50° C. Electrical connections (not shown) can pass through the vanes 26, and possibly a portion of the splitter nose 22, as an axial section of the compressor.

According to an embodiment of the invention, the heating module comprises a magnetic field source capable of heating the abradable layer, for example by generating an alternating current in the electric heating resistors. The magnetic field source can be housed in the splitter nose.

The present teaching can also be applied to the abradable layer 32 of the outer shroud 30 of the splitter nose 22, which can house a heating module as previously described.

Figure 4:
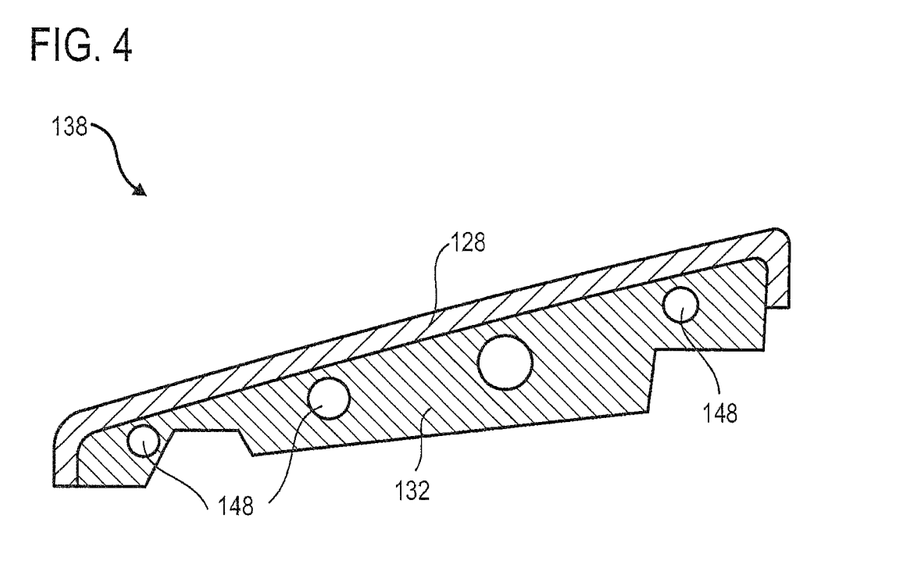
FIG. 4 illustrates a shroud assembly according to a second embodiment of the invention.

FIG. 4 represents an assembly according to a second embodiment of the invention. This FIG. 4 repeats the numbering of the preceding figures for identical or similar elements; however, the numbering is incremented by 100. Specific numbers are used for the elements specific to this embodiment. FIG. 4 provides an enlargement of the inner shroud 128.

The second embodiment is substantially identical to the first embodiment, it is distinguished by the presence of ducts 148 in the heating module 138. These ducts 148 can be directly formed by the clean material of the layer of abradable material 132, or by pipes integrated therein. The ducts 148 can form a network within the thickness of the abradable layer 132, they follow the circumference and the axial length of the inner shell 128. They can form several toruses internal to the shroud. Their sections of passage may vary from one torus to another.

These ducts 148 may convey a heating fluid, for example a hot gas taken from the high-pressure compressor, or a liquid such as the lubricating oil of the turbomachine. The circulation of the fluid warms the shroud 128 and opposes the presence of frost.

Figure 5:
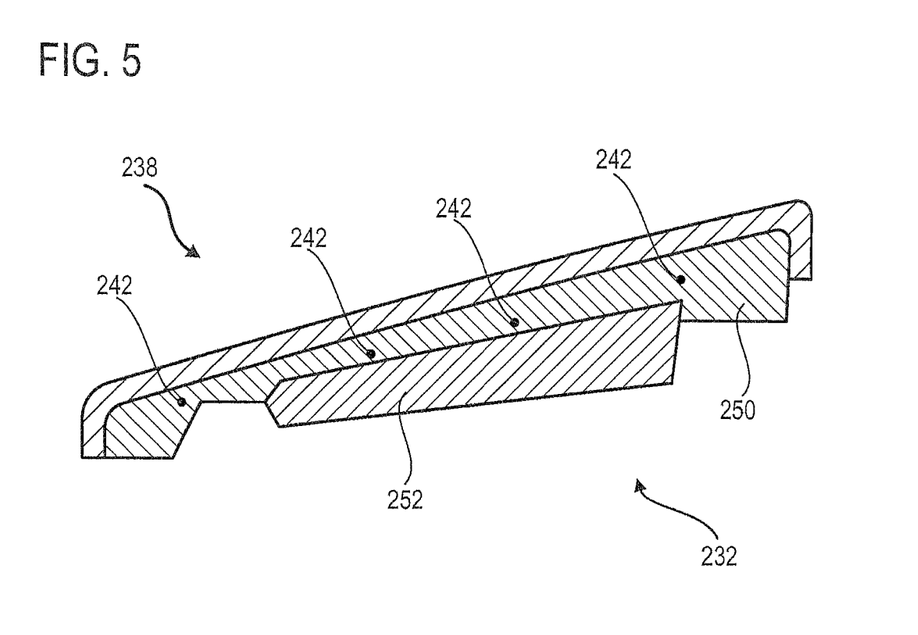
FIG. 5 illustrates a shroud assembly according to a third embodiment of the invention.

FIG. 5 represents an assembly according to a third embodiment of the invention. This FIG. 5 repeats the numbering of the preceding figures for identical or similar elements; however, the numbering is incremented by 200. Specific numbers are used for the elements specific to this embodiment.

The third embodiment is substantially identical to the first embodiment, but it differs in that the abradable layer 232 is split, in particular radially. It comprises an outer annular layer 250, also called second layer; and an inner annular layer 252, also called the first layer, fitted in the second layer. The outer layer 250 can receive the heating module 238, and in particular the electric resistors 242. It can be a thermally conductive layer, which conveys more heat than the inner layer 252, for example at least twice, or at least ten times. The heating module 238 can essentially be enclosed in the outer layer 250.

This configuration conveys the heat to the wall of the shroud to better de-ice it.

Figure 6:
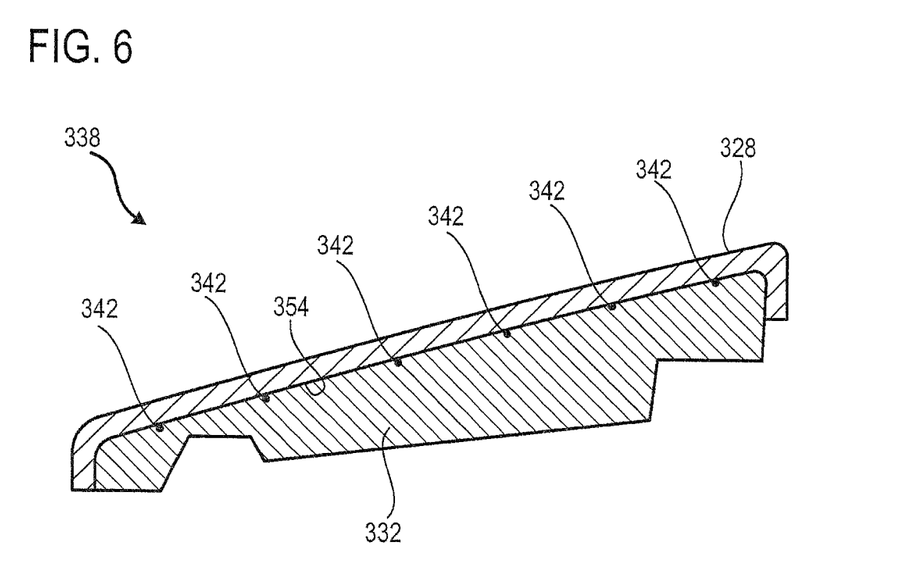
FIG. 6 illustrates a shroud assembly according to a fourth embodiment of the invention.

FIG. 6 shows an assembly according to a fourth embodiment of the invention. This FIG. 6 repeats the numbering of the preceding figures for the identical or similar elements, the number being however incremented by 300.

The fourth embodiment is substantially identical to the first embodiment, but it differs in that the heating module 338 is disposed on the envelope of the abradable layer 332, the envelope can form the skin of the abradable layer. The heating module 338, and in particular each electric heating resistor 342 is disposed at the interface between the inner shroud 328 and the layer of abradable material 332. The heating module 338 remains within the thickness of the abradable layer 332. The shroud 328 has an essentially smooth interface surface 354 in contact with the abradable 332 and the module 338.

Figure 7:
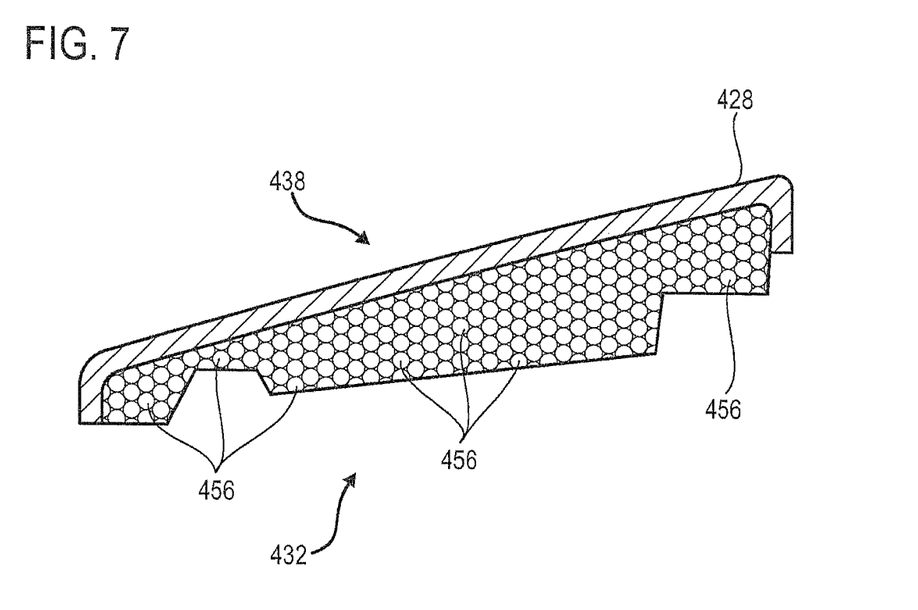
FIG. 7 illustrates a shroud assembly according to a fifth embodiment of the invention.

FIG. 7 shows an assembly according to a fifth embodiment of the invention. This FIG. 7 repeats the numbering of the preceding figures for identical or similar elements; however, the numbering is incremented by 400. Specific numbers are used for the elements specific to this embodiment.

The fifth embodiment is substantially identical to the first embodiment. However, it differs in the presence of particles 456 in the heating module 438. These particles 456 are electrically conductive. They are distributed throughout the abradable material 432. They can be distributed in an electrically insulating matrix. They can be in contact with each other, and powered by connections. Then, the abradable material is electrically resistive and is configured to heat in order to oppose the presence of frost on the shroud 428. Alternatively, the particles 456 may be spaced from one another and be heated by electromagnetic waves, such as by an electric field or a magnetic field.

According to the invention, a shroud can combine the five embodiments of the invention. The heating modules can be distributed axially and/or radially in the core of the same layer of abradable.

The invention claimed is:

1. A shroud assembly for an axial turbomachine with a rotor, the assembly comprising:
   a shroud with a layer of abradable material adapted to abrasively cooperate with the rotor of the turbomachine; and
   a heating module for heating the layer of abradable material so as to counter-act the presence of ice on the shroud.

2. The shroud assembly according to claim 1, wherein the heating module comprises:
   a resistor in thermal contact with the layer of abradable material.

3. The shroud assembly according to claim 2, wherein the resistor has a section that is less than 1 mm² or less than 0.10 mm².

4. The shroud assembly according to claim 2, wherein the resistor is embedded within the layer of abradable material.

5. The shroud assembly according to claim 1, wherein the heating module comprises:
   one or several heating electric ribbons.

6. The shroud assembly according to claim 1, wherein the layer of abradable material is electrically resistive and is configured to heat so as to counter-act the presence of ice on the shroud when the heating module feeds electrically the layer of abradable material.

7. The shroud assembly according to claim 1, wherein the layer of abradable material comprises:
   particles that are electrically conductive and configured for heating the shroud so as to counter-act the presence of ice on the shroud.

8. The shroud assembly according to claim 1, wherein the shroud comprises:
   an annular wall bearing the layer of abradable material.

9. The shroud assembly according to claim 1, wherein the heating module comprises:
   a source of magnetic field adapted to heat the layer of abradable material.

10. The shroud assembly according to claim 1, wherein the abradable layer comprises:
    a first annular layer radially remote from the heating module and/or a second annular layer in contact with the heating module.

11. The shroud assembly according to claim 10, wherein the first annular layer and the second annular layer have respective thermal conductivity, the thermal conductivity of the second annular layer being greater than the thermal conductivity of the first annular layer.

12. The shroud assembly according to claim 1, wherein the heating module comprises:
    a heating network in thermal contact with the layer of abradable material, said network being embedded within the layer of abradable material.

13. The shroud assembly according to claim 12, wherein the network comprises:
    one or more conduits for a heating fluid such as oil.

14. A turbojet, comprising:
    at least one shroud assembly; and
    a low-pressure compressor with a rotor;
    wherein the shroud assembly comprises:
        a shroud with a layer of abradable material adapted to abrasively cooperate with the rotor of the compressor; and
        a heating module for heating the layer of abradable material so as to counter-act the presence of ice on the shroud;
    wherein the shroud is an internal or an external shroud of the low-pressure compressor.

15. The turbojet according to claim 14, further comprising:
    a separating splitter at an inlet of the compressor, the shroud of the shroud assembly being an external shroud of the separating splitter.

16. The turbojet according to claim 14, further comprising:
    a control unit configured to heat the layer of abradable material so that the temperature of the shroud remains above 0° C.

17. The turbojet according to claim 14, further comprising:
    an annular row of stator vanes rigidly connected to the shroud, the heating module being adapted to heat the layer of abradable material so as to counter-act the presence of ice on said stator vanes.

18. The turbojet according to claim 14, wherein the rotor of the compressor comprises:
    wipers abrasively cooperating with the layer of abradable material.

19. The turbojet according to claim 18, wherein the wipers are arranged axially and/or radially remote from the heating module.

20. The turbojet according to claim 14, wherein the layer of abradable material comprises:
a polymeric nickel aluminum composition.

\* \* \* \* \*